US012597168B2

(12) United States Patent
Kim et al.

(10) Patent No.: US 12,597,168 B2
(45) Date of Patent: Apr. 7, 2026

(54) METHOD FOR CONVERTING NEAR INFRARED IMAGE TO RGB IMAGE AND APPARATUS FOR SAME

(71) Applicant: KOREA UNIVERSITY RESEARCH AND BUSINESS FOUNDATION, Seoul (KR)

(72) Inventors: Jong Ok Kim, Seoul (KR); Tae Sung Park, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 303 days.

(21) Appl. No.: 18/375,696

(22) Filed: Oct. 2, 2023

(65) Prior Publication Data

US 2024/0119633 A1 Apr. 11, 2024

(30) Foreign Application Priority Data

Oct. 7, 2022 (KR) ........................ 10-2022-0128374
Jan. 30, 2023 (KR) ........................ 10-2023-0011746

(51) Int. Cl.
*G06K 9/00* (2022.01)
*G06T 5/00* (2006.01)
(Continued)

(52) U.S. Cl.
CPC .................. *G06T 7/90* (2017.01); *G06T 5/00* (2013.01); *G06T 7/0002* (2013.01); *G06T 7/40* (2013.01);
(Continued)

(58) Field of Classification Search
CPC ................................ G06T 5/00; G06T 7/0002
See application file for complete search history.

(56) References Cited

U.S. PATENT DOCUMENTS

2020/0242355 A1* 7/2020 Kim ...................... G06V 10/454
2023/0251131 A1* 8/2023 Corbett ................. G01J 3/0294
356/456

FOREIGN PATENT DOCUMENTS

KR 10-2017-0103707 A 9/2017

OTHER PUBLICATIONS

Sun, Tian, et al., "NIR Image Colorization Using SPADE Generator and Grayscale Approximated Self-Reconstruction", 2020 IEEE International Conference on Visual Communications and Image Processing, Dec. 1-4, 2020, (p. 463-466).
(Continued)

*Primary Examiner* — Emily C Terrell
*Assistant Examiner* — Aidan Keup
(74) *Attorney, Agent, or Firm* — NSIP Law

(57) ABSTRACT

The method for converting a near-infrared image into an RGB image includes: (a) receiving near-infrared image data to be converted into an RGB image and inputting the received data to the first network; (b) extracting, by the first network, feature data of a near-infrared image from the input near-infrared image data; and (c) outputting, by the first network, an estimated RGB image, which enables to convert the received near-infrared image data into an RGB image, using the extracted feature data of the near-infrared image, wherein the first network performs knowledge distillation learning by receiving knowledge, which enables to mimic the behavior of extracting the feature data of the near-infrared image and the feature data of the RGB image, from the second network which has received as input data not only near-infrared image data as learning data but also RGB image data taken at the same time as the near-infrared image.

11 Claims, 11 Drawing Sheets

(51) Int. Cl.
  G06T 7/00         (2017.01)
  G06T 7/40         (2017.01)
  G06T 7/90         (2017.01)
(52) U.S. Cl.
  CPC .............. *G06T 2207/10048* (2013.01); *G06T 2207/20081* (2013.01); *G06T 2207/30168* (2013.01)

(56)                    References Cited

OTHER PUBLICATIONS

Park, Min-Je, et al., "Multi-Band NIR Colorization Using Structure-Aware Network", 2021 Asia-Pacific Signal and Information Processing Association Annual Summit and Conference, Dec. 14-17, 2021, (p. 1682-1686).

Kumar, Himanshu, et al., "ParaColorizer: Realistic Image Colorization using Parallel Generative Networks", The Visual Computer, arXiv:2208.08295v1, Aug. 17, 2022 (11 Pages in English).

Chi, Qiang, et al., "A Novel Knowledge Distillation Method for Self-Supervised Hyperspectral Image Classification", Remote Sensing, Sep. 10, 2022, (20 Pages in English).

Korean Office Action Issued on Jan. 22, 2024, in Counterpart Korean Patent Application No. 10-2023-0011746 (6 Pages in Korean).

Park, Tae-Sung, Tae-Hyeon Kim, and Jong-Ok Kim. "Feature Distillation Network for Multi-Band NIR Colorization." *2022 Asia-Pacific Signal and Information Processing Association Annual Summit and Conference (APSIPA ASC).* IEEE, 2022.

* cited by examiner

FIG. 2

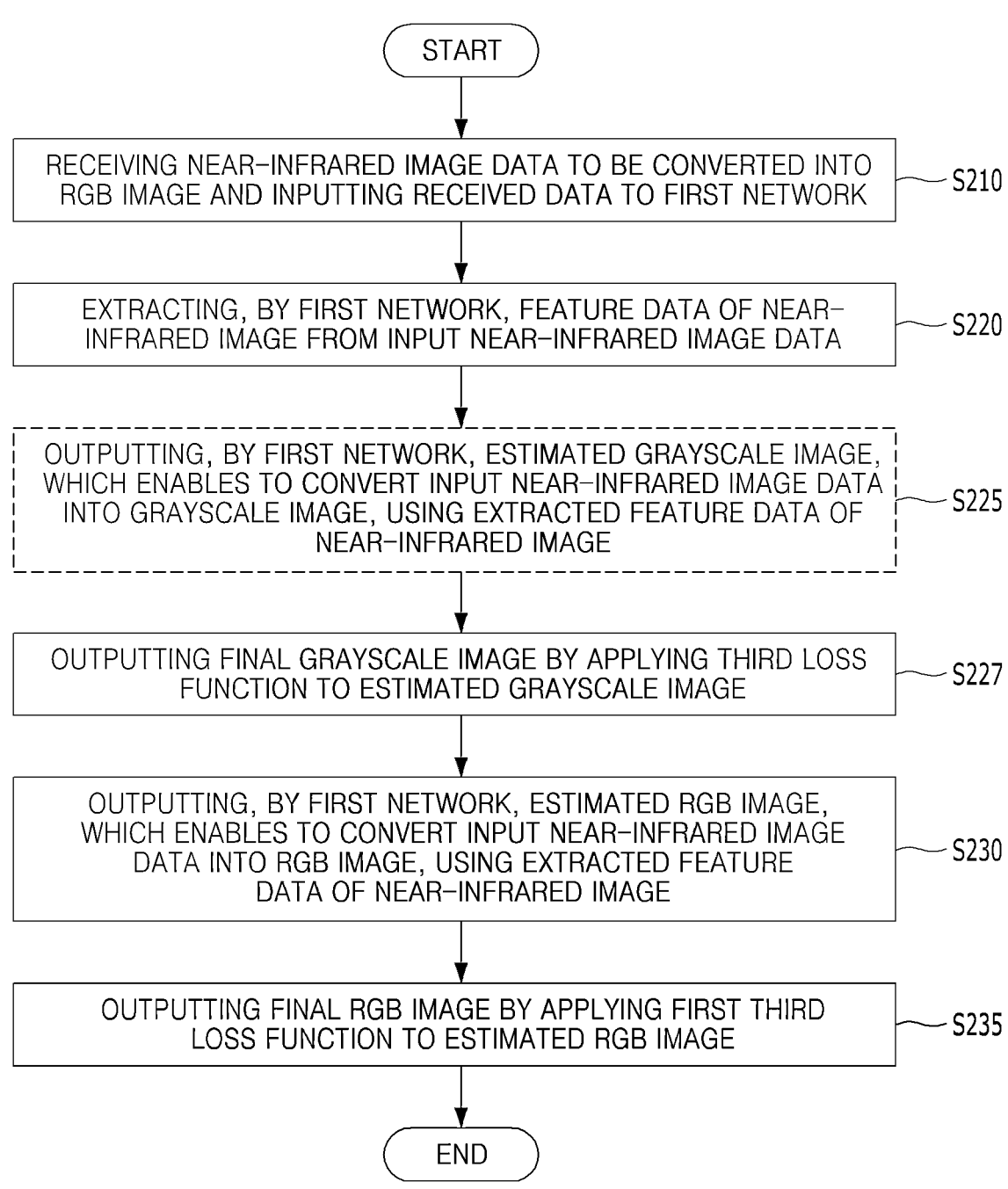

START

↓

RECEIVING NEAR-INFRARED IMAGE DATA TO BE CONVERTED INTO RGB IMAGE AND INPUTTING RECEIVED DATA TO FIRST NETWORK — S210

↓

EXTRACTING, BY FIRST NETWORK, FEATURE DATA OF NEAR-INFRARED IMAGE FROM INPUT NEAR-INFRARED IMAGE DATA — S220

↓

OUTPUTTING, BY FIRST NETWORK, ESTIMATED GRAYSCALE IMAGE, WHICH ENABLES TO CONVERT INPUT NEAR-INFRARED IMAGE DATA INTO GRAYSCALE IMAGE, USING EXTRACTED FEATURE DATA OF NEAR-INFRARED IMAGE — S225

↓

OUTPUTTING FINAL GRAYSCALE IMAGE BY APPLYING THIRD LOSS FUNCTION TO ESTIMATED GRAYSCALE IMAGE — S227

↓

OUTPUTTING, BY FIRST NETWORK, ESTIMATED RGB IMAGE, WHICH ENABLES TO CONVERT INPUT NEAR-INFRARED IMAGE DATA INTO RGB IMAGE, USING EXTRACTED FEATURE DATA OF NEAR-INFRARED IMAGE — S230

↓

OUTPUTTING FINAL RGB IMAGE BY APPLYING FIRST THIRD LOSS FUNCTION TO ESTIMATED RGB IMAGE — S235

↓

END

RGB image    NIR (785nm)

NIR (850nm)    NIR (940nm)

FIG. 8

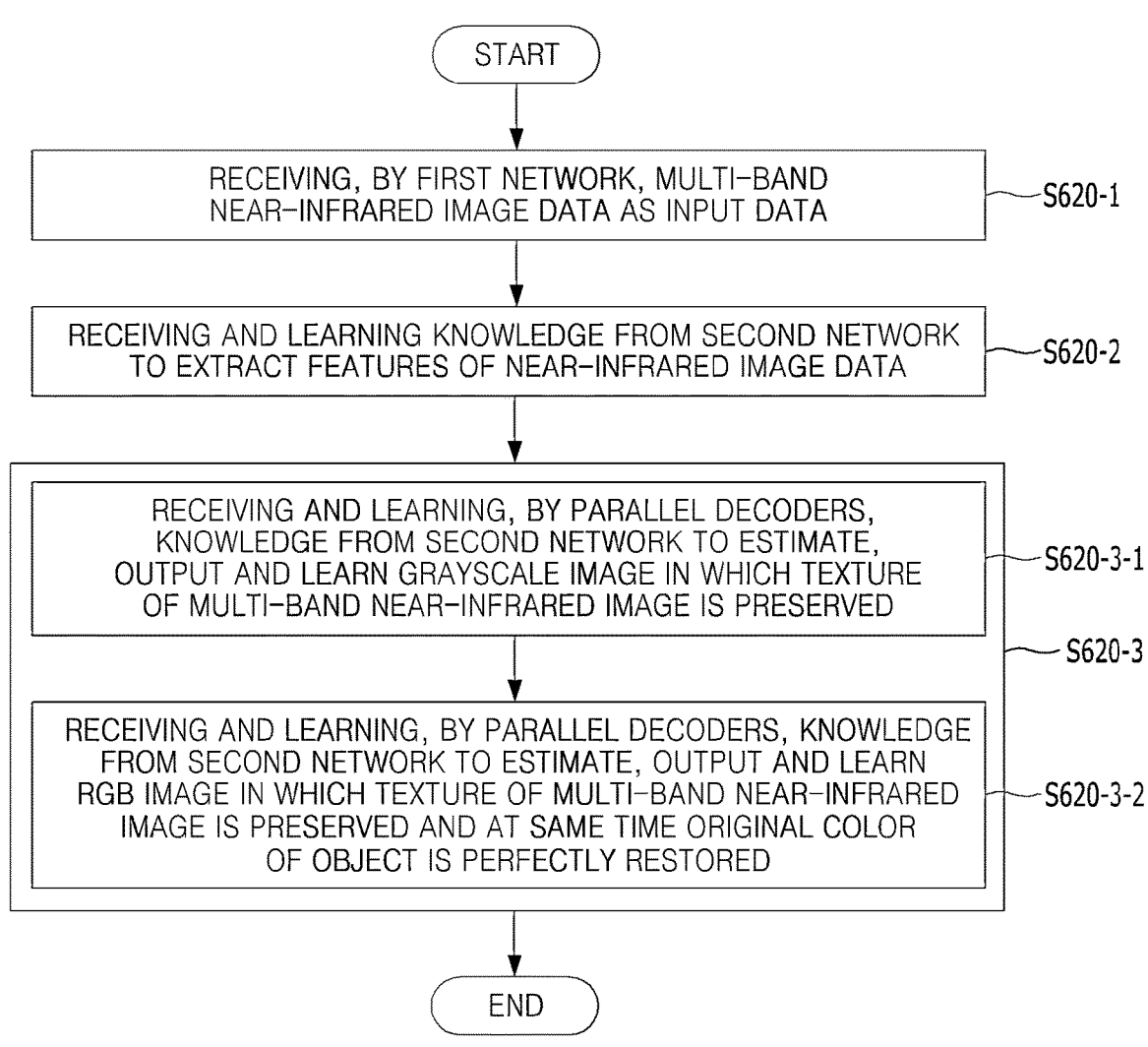

START

RECEIVING, BY FIRST NETWORK, MULTI-BAND
NEAR-INFRARED IMAGE DATA AS INPUT DATA ⎯S620-1

RECEIVING AND LEARNING KNOWLEDGE FROM SECOND NETWORK
TO EXTRACT FEATURES OF NEAR-INFRARED IMAGE DATA ⎯S620-2

RECEIVING AND LEARNING, BY PARALLEL DECODERS,
KNOWLEDGE FROM SECOND NETWORK TO ESTIMATE,
OUTPUT AND LEARN GRAYSCALE IMAGE IN WHICH TEXTURE
OF MULTI-BAND NEAR-INFRARED IMAGE IS PRESERVED ⎯S620-3-1

⎯S620-3

RECEIVING AND LEARNING, BY PARALLEL DECODERS, KNOWLEDGE
FROM SECOND NETWORK TO ESTIMATE, OUTPUT AND LEARN
RGB IMAGE IN WHICH TEXTURE OF MULTI-BAND NEAR-INFRARED
IMAGE IS PRESERVED AND AT SAME TIME ORIGINAL COLOR
OF OBJECT IS PERFECTLY RESTORED ⎯S620-3-2

END

METHOD FOR CONVERTING NEAR INFRARED IMAGE TO RGB IMAGE AND APPARATUS FOR SAME

CROSS-REFERENCE TO RELATED PATENT APPLICATION

This application claims the benefit of Korean Patent Application No. 10-2022-0128374, filed on Oct. 7, 2022 and No. 10-2023-0011746, filed on Jan. 30, 2023, in the Korean Intellectual Property Office, the disclosure of which is incorporated herein in its entirety by reference.

BACKGROUND OF THE INVENTION

1. Field of the Invention

The present invention relates to a method for converting a near-infrared image into an RGB image and an apparatus for the same. More specifically, the present invention relates to a method for converting a near-infrared image into an RGB image and an apparatus for the same by utilizing knowledge distillation learning, which can preserve the texture of the image and perfectly restore the original color of an object.

2. Description of the Related Art

Near-infrared images are typically acquired in the wavelength range of 700 nm to 1000 nm, and unlike RGB images, these near-infrared images are widely used for night-time surveillance and monitoring due to the advantages such as low noise and the ability to maintain image texture and detail even in low-light conditions. However, unlike RGB images, near-infrared images do not contain color information, making them unsuitable for human perception since they are not visible to the naked eye, and these images cannot be directly applied to computer vision algorithms.

To address these problems, extensive research has been conducted to convert single-band near-infrared images into RGB images while preserving the advantages of the near-infrared images. However, since the near-infrared images do not inherently contain color information, it is very difficult to successfully restore the original color information from them, and some research argues that the concept of converting near-infrared images into RGB images itself is fundamentally flawed. As a result, there have been no clear research outcomes thus far.

REFERENCES OF THE RELATED ART

Patent Document

Korean Patent Application Publication No.: 10-2017-0103707 (published on Sep. 13, 2017)

SUMMARY OF THE INVENTION

The present invention has been made in an effort to solve the above-described problems associated with prior art, and an object of the present invention is to provide a method for converting a near-infrared image into an RGB image and an apparatus for the same, which can effectively convert a near-infrared image which does not contain color information into an RGB image which contains color information.

Another object of the present invention is to provide a method for converting a near-infrared image into an RGB image and an apparatus for the same, which can convert a near-infrared image into a high-quality RGB image in which the color information of the near-infrared image is effectively stored, while maintaining the advantages of the near-infrared image, such as low noise and the ability to maintain image texture and detail even in low-light conditions.

The above-mentioned objects of the present invention are not limited to those mentioned above, and other objects not mentioned will be clearly understood by those skilled in the art from the following description.

To achieve the above-mentioned object, one embodiment of the present invention provides a method for converting a near-infrared image into an RGB image, performed by an apparatus comprising a first network and a second network, the method comprising the steps of: (a) receiving near-infrared image data to be converted into an RGB image and inputting the received data to the first network; (b) extracting, by the first network, feature data of a near-infrared image from the input near-infrared image data; and (c) outputting, by the first network, an estimated RGB image, which enables to convert the received near-infrared image data into an RGB image, using the extracted feature data of the near-infrared image, wherein the first network performs knowledge distillation learning by receiving knowledge, which enables to mimic the behavior of extracting the feature data of the near-infrared image and the feature data of the RGB image, from the second network which has received as input data not only near-infrared image data as learning data but also RGB image data taken at the same time as the near-infrared image.

According to one embodiment, the near-infrared image data in step (a) and the near-infrared image data as learning data may be multi-band near-infrared image data and may be image data acquired with a plurality of different optical filters.

According to one embodiment, the plurality of different optical filters may comprise three optical band-pass filters with the peak wavelengths of 785 nm, 850 nm, and 940 nm.

According to one embodiment, the first network and the second network may have the same structure including one encoder and two parallel decoders.

According to one embodiment, the first network performs knowledge distillation learning by receiving knowledge, which enables to mimic the behavior of estimating the images for the output of grayscale images and RGB images from the near-infrared image data as learning data and the RGB image data from the second network which has extracted the feature data of the near-infrared image and the feature data of the RGB image.

According to one embodiment, the method may further comprise, after step (c), the step of: (d) outputting a final RGB image by applying a first loss function ($L_{rgb}$) to the estimated RGB image output in step (c), wherein the first loss function may be the sum of three loss functions as follows:

$$\text{First loss function } (L_{rgb}) = L_{content} + L_{perceptual} + L_{angular}.$$

Here, $L_{content}$ is the L1 norm between the final RGB image and a ground-truth RGB image, $L_{perceptual}$ is a criterion for evaluation of consistency of detail and texture of the final RGB image, and $L_{angular}$ is an angular error for improving the color restoration quality of the final RGB image.

According to one embodiment, the knowledge distillation learning may be performed by applying a second loss function ($L_{kd}$), which can be defined as follows:

Second loss function $(L_{kd}) = \sum_{[i \in layers]} \left\| F_i^S - \alpha(F_i^T) \right\|_2$.

Here, the second loss function is the L2 norm between a feature map of the second network, $F^T$, and a feature map of the first network, $F^S$, where $\alpha$ is an illustrative additional operation performed to make the feature map of the second network more useful for the learning of the first network.

According to one embodiment, the method may further comprise, between steps (b) and (c), the step of: (b') outputting, by the first network, an estimated grayscale image, which enables to convert the input near-infrared image data into a grayscale image, using the extracted feature data of the near-infrared image.

According to one embodiment, the method may further comprise, between steps (b') and (c), the step of: (b") outputting a final grayscale image by applying a third loss function $(L_{gray})$ to the estimated grayscale image output in step (b'), wherein the third loss function may be the sum of two loss functions as follows:

Third loss function $(L_{gray}) = L_{struct} + L_{SSIM}$.

Here, $L_{struct}$ is the L1 norm between the final grayscale image and a ground-truth grayscale image and $L_{SSIM}$ is a loss function for enhancing the structural similarity between the final grayscale image and the ground-truth grayscale image.

To achieve the above-mentioned object, another embodiment of the present invention provides an apparatus for converting a near-infrared image into an RGB image, comprising: one or more processors; a network interface; a memory for loading a computer program executed by the processor; and a storage for storing large-scale network data and the computer program, wherein the computer program, when executed, causes the one or more processors to perform the operations of: (A) receiving near-infrared image data to be converted into an RGB image and inputting the received data to a first network; (B) extracting, by the first network, feature data of a near-infrared image from the input near-infrared image data; and (C) outputting, by the first network, an estimated RGB image, which enables to convert the received near-infrared image data into an RGB image, using the extracted feature data of the near-infrared image, and wherein the first network performs knowledge distillation learning by receiving knowledge, which enables to mimic the behavior of extracting the feature data of the near-infrared image and the feature data of the RGB image, from the second network which has received as input data not only near-infrared image data as learning data but also RGB image data taken at the same time as the near-infrared image.

To achieve the above-mentioned object, still another embodiment of the present invention provides a computer program stored on a computer-readable medium, when executed on a computing device, performing the steps of: (AA) receiving near-infrared image data to be converted into a RGB image and inputting the received data to a first network; (BB) extracting, by the first network, feature data of a near-infrared image from the input near-infrared image data; and (CC) outputting, by the first network, an estimated RGB image, which enables to convert the received near-infrared image data into an RGB image, using the extracted feature data of the near-infrared image, and wherein the first network performs knowledge distillation learning by receiving knowledge, which enables to mimic the behavior of extracting the feature data of the near-infrared image and the feature data of the RGB image, from the second network which has received as input data not only near-infrared image data as learning data but also RGB image data taken at the same time as the near-infrared image.

According to the present invention as described above, by employing the knowledge distillation learning, the second network 12, which is a teacher network, receives as input data not only near-infrared image data but also RGB image data taken at the same time as the near-infrared image data, and based on this, transfers the knowledge, which enables to mimic the behavior of extracting the feature data of the near-infrared image and the feature data of the RGB image, as well as the knowledge, which enables to mimic the behavior of estimating the images for the output of grayscale images and RGB images from the near-infrared image data and the RGB image data, to the first network 11, which is a student network, facilitating a rapid and efficient learning. As a result, even if only a near-infrared image which does not contain color information is input, it is possible to effectively convert the input image into an RGB image which contains color information.

Furthermore, the quality of image conversion is improved by applying a loss function for the knowledge distillation learning, a loss function for estimating the final grayscale image, and a loss function for estimating the final RGB image, and thus it is possible to obtain a high-quality RGB image in which the texture and detail of the multi-band near-infrared image is preserved and the original color of an object is perfectly restored.

In addition, by utilizing the multi-band near-infrared images acquired with three different optical band-pass filters instead of single-band near-infrared images, it is possible to obtain more detailed information, making it useful for finding the correlation between each near-infrared band and RGB spectrum, thereby improving the learning efficiency of the network.

The effects of the present invention are not limited to the effects mentioned above, and other effects not mentioned will be clearly understood by those skilled in the art from the description below.

BRIEF DESCRIPTION OF THE DRAWINGS

The above and other features and advantages of the present invention will become more apparent by describing in detail preferred embodiments thereof with reference to the attached drawings in which:

FIG. 2 is a flowchart illustrating the main steps of a method for converting a near-infrared image into an RGB image according to a second embodiment of the present invention;

FIG. 8 is a flowchart illustrating the learning process of the first network used in the method for converting a near-infrared image into an RGB image according to the second embodiment of the present invention;

DETAILED DESCRIPTION OF THE INVENTION

Figure 1:
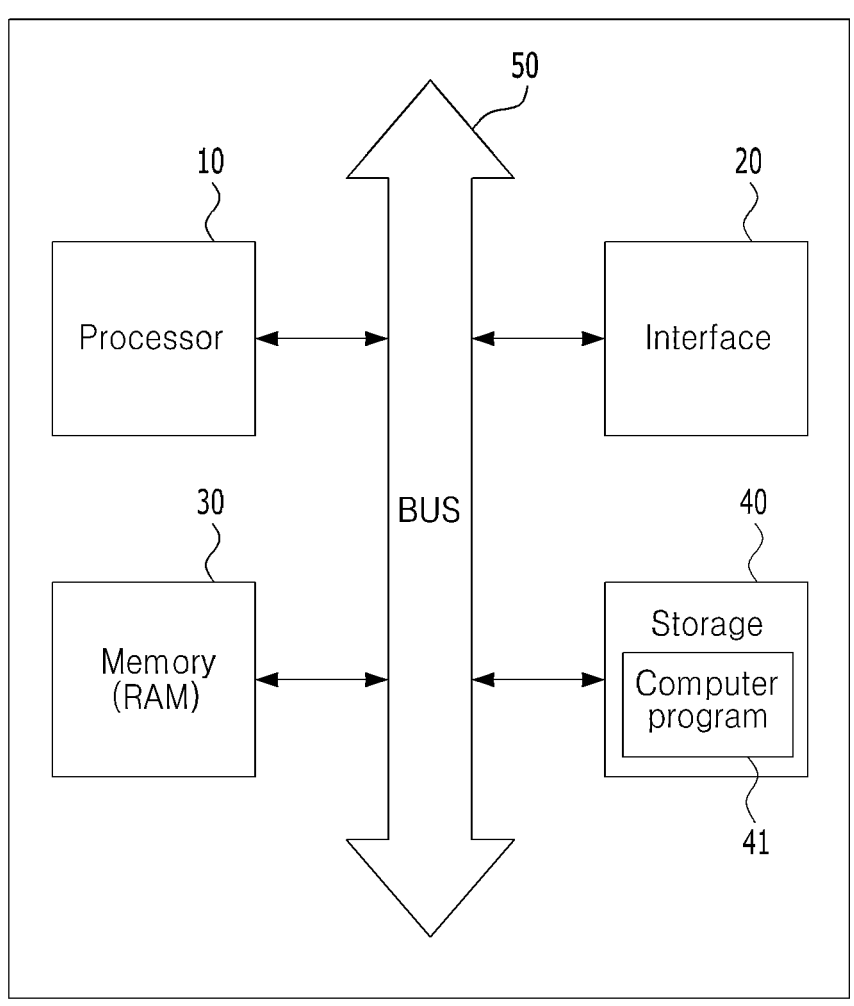
FIG. 1 is a diagram illustrating the overall configuration of an apparatus for converting a near-infrared image into an RGB image according to a first embodiment of the present invention.

Details regarding the objects and technical features of the present invention and the resulting effects will be more clearly understood from the following detailed description based on the drawings attached to the specification of the present invention. Preferred embodiments according to the present invention will be described in detail with reference to the attached drawings.

The embodiments disclosed in this specification should not be construed or used as limiting the scope of the present invention. It is obvious to those skilled in the art that the description, including the embodiments, of this specification has various applications. Therefore, any embodiments described in the detailed description of the present invention are illustrative to better illustrate the present invention and are not intended to limit the scope of the present invention to the embodiments.

The functional blocks shown in the drawings and described below are only examples of possible implementations. In other implementations, different functional blocks may be used without departing from the spirit and scope of the detailed description. Moreover, although one or more functional blocks of the present invention are shown as individual blocks, one or more of the functional blocks of the present invention may be a combination of various hardware and software components that perform the same function.

Furthermore, the term "comprising" certain components, which is an "open-ended" term, simply refers to the presence of the corresponding components, and should not be understood as excluding the presence of additional components.

In addition, if a specific component is referred to as being "connected" or "coupled" to another component, it should be understood that it may be directly connected or coupled to another other component, but there may be other components therebetween.

Hereinafter, preferred embodiments of the present invention will be described in detail with reference to the accompanying drawings.

FIG. 1 is a diagram illustrating the overall configuration of an apparatus 100 for converting a near-infrared image into an RGB image according to a first embodiment of the present invention.

However, this is merely a preferred embodiment to achieve the object of the present invention, and it is understood that some components may be added or deleted as needed and one component's role may be performed in conjunction with another component.

The apparatus 100 for converting a near-infrared image into an RGB image according to the first embodiment of the present invention may comprise a processor 10, a network interface 20, a memory 30, a storage 40, and a data bus 50 connecting these components. Moreover, it may also include other additional components required to achieve the object of the present invention.

The processor 10 may control the overall operation of each component. The processor 10 may be any one of a central processing unit (CPU), a microprocessor unit (MPU), a microcontroller unit (MCU), or an artificial intelligence processor commonly known in the art to which the present invention pertains. Furthermore, the processor 10 may perform an operation on at least one application or program for performing the method for converting a near-infrared image into an RGB image according to the second embodiment of the present invention. For this purpose, the processor 10 may include a first network 11 and a second network 12 that perform knowledge distillation learning, and these networks can be trained with learning data, which will be described later.

The network interface 20 may support wired and wireless Internet communications for the apparatus 100 for converting a near-infrared image into an RGB image according to the first embodiment of the present invention and may also support other known communication methods. Therefore, the network interface 20 may be configured to include a corresponding communication module.

The memory 30 may store various information, commands, and/or information and load one or more computer programs 41 from the storage 40 to perform the method for converting a near-infrared image into an RGB image according to the second embodiment of the present invention. In FIG. 1, RAM is shown as the memory 30, but any of various storage media can also be used as the memory 30.

The storage 40 may non-temporarily store one or more computer programs 41 and large-scale network information 42. This storage 40 may be any one of a read only memory (ROM), an erasable programmable ROM (EPROM), an electrically erasable programmable ROM (EEPROM), a flash memory, a hard disk drive (HDD), a solid-state drive (SSD), a removable disk, or a computer-readable recording medium commonly known in the art to which the present invention pertains.

The computer program 41 may be loaded into the memory 30 and can be executed by one or more processors 10 to perform the operations of: (A) receiving near-infrared image data to be converted into an RGB image and inputting the received data to the first network; (B) extracting, by the first network, feature data of a near-infrared image from the input near-infrared image data; and (C) outputting, by the first network, an estimated RGB image, which enables to convert the received near-infrared image data into an RGB image, using the extracted feature data of the near-infrared image.

The briefly mentioned operations performed by the computer program 41 can be considered as one function of the computer program 41, and a more detailed description will be provided in the description of the method for converting a near-infrared image into an RGB image according to the second embodiment of the present invention.

The data bus 50 serves as a pathway for the movement of commands and/or information between the processor 10, the network interface 20, the memory 30, and the storage 40 as described above.

The apparatus 100 for converting a near-infrared image into an RGB image according to the first embodiment of the present invention as described above may be in the form of a stand-alone device, for example, an electronic device or server (including a cloud server). In this context, the electronic devices may include not only devices such as desktop PCs and server devices that are fixedly installed and used in one place, but also portable devices that are easy to carry, such as smartphones, tablet PCs, laptop PCs, PDAs, and PMPs, and it is suitable for any electronic device that includes a CPU corresponding to the processor 10 and has a network function.

Hereinafter, on the assumption that the apparatus 100 for converting a near-infrared image into an RGB image according to the first embodiment of the present invention is in the form of a "server" among the stand-alone electronic devices, the process of implementing the method for converting a near-infrared image into an RGB image according to the second embodiment of the present invention by means of a dedicated application installed on a user terminal (now shown) of a user who wants to convert a near-infrared image into an RGB image will be described with reference to FIGS. 2 to 11.

FIG. 2 is a flowchart illustrating the main steps of the method for converting a near-infrared image into an RGB image according to a second embodiment of the present invention.

However, this is merely a preferred embodiment to achieve the object of the present invention, and it is understood that some steps may be added or deleted as needed and one step may be included and performed within another step.

Meanwhile, it is assumed that each step is performed by means of the apparatus 100 for converting a near-infrared image into an RGB image according to the first embodiment of the present invention, and since it has been assumed that the apparatus 100 for converting a near-infrared image into an RGB image according to the first embodiment of the present invention is in the form of a "server", the dedicated application installed on a user terminal (now shown) will be considered equivalent to the apparatus 100 for converting a near-infrared image into an RGB image according to the first embodiment of the present invention, and for the convenience of description, both will be referred to as the "apparatus 100."

Furthermore, the terms "video" and "image" as used herein may be used interchangeably with the same meaning. This is because, in principle, a video at a specific moment is an image, while a connection of images for a specific period is a video, and thus the two terms are distinct from each other; however, these terms have the same meaning in the method for converting a near-infrared image into an RGB image according to a second embodiment of the present invention.

First, the apparatus 100 receives near-infrared image data to be converted into an RGB image and inputs the received data to the first network 11 (S210).

Here, the near-infrared image data to be converted into an RGB image is not single-band near-infrared image data as in the prior art, but rather image data acquired over the near-infrared range of 700 nm and 1000 nm with a plurality of different optical filters, for example, multi-band near-infrared image data acquired with three optical band-pass filters with the peak wavelengths of 785 nm, 850 nm, and 940 nm.

The apparatus for converting a near-infrared image into an RGB image according to the second embodiment of the present invention uses multi-band near-infrared image data as input data, which is because that the multi-band near-infrared image data contains more information than single-band near-infrared image data, making it useful for finding the correlation between each near-infrared band and RGB spectrum.

The apparatus 100 may receive such multi-band near-infrared image data, where the input is a broad concept that encompasses the cases where the apparatus 100 receives multi-band near-infrared image data captured by a dedicated camera (not shown), which is a separate device from the apparatus 100, directly or via a network, and an example of the dedicated camera may be AD-130GE from JAI, which can simultaneously capture near-infrared images and RGB images. Moreover, if the apparatus 100 is not in the form of a server, but an electronic device that includes a camera as one of its components, it encompasses the case where the apparatus 100 receives multi-band near-infrared image data captured by the camera for processing.

Figure 3:
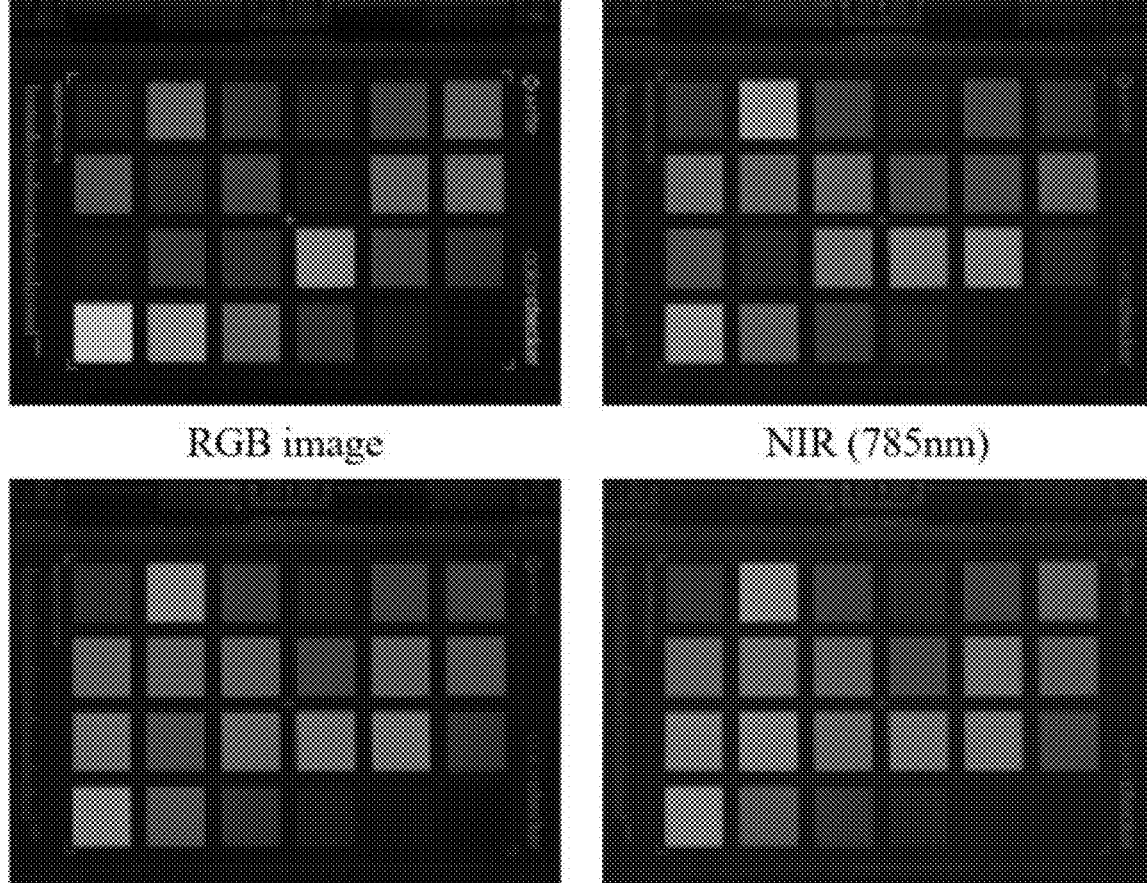
FIG. 3 is a diagram illustrating examples of multi-band near-infrared images acquired with three optical band-pass filters with the peak wavelengths of 785 nm, 850 nm, and 940 nm from a single RGB image.

FIG. 3 is a diagram illustrating examples of multi-band near-infrared images acquired with three optical band-pass filters with the peak wavelengths of 785 nm, 850 nm, and 940 nm from a single RGB image, from which it can be seen that all three near-infrared images are grayscale images, which do not contain color information, unlike the RGB image that contains the color information.

The apparatus 100 inputs the near-infrared image data to be converted into an RGB image into the first network, and since the first network 11 is a network included in the processor 10, the input of data to the first network 11 can be considered as the start of the process of converting the data into an RGB image by the processor 10. Next, the first network 11 and the second network 12, which have not yet been described, will be described below.

Figure 4:
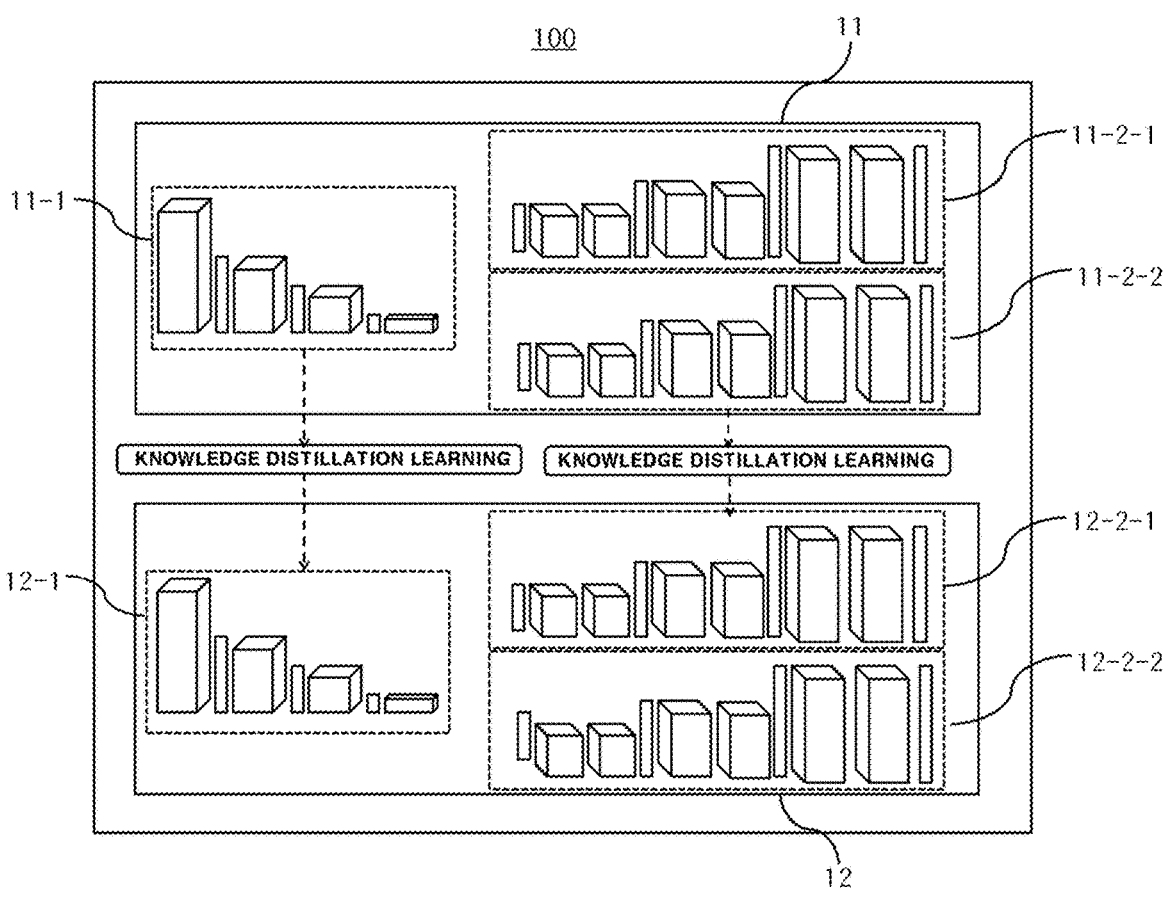
FIG. 4 is a diagram illustrating the internal structures of a first network and a second network used in the method for converting a near-infrared image into an RGB image according to the second embodiment of the present invention.

FIG. 4 is a diagram illustrating the internal structures of the first network 11 and the second network 12 used in the method for converting a near-infrared image into an RGB image according to the second embodiment of the present invention.

Referring to FIG. 4, it can be seen that the first network 11 and the second network 12 have the same structure, each including one encoder 11-1, 12-1 and two parallel decoders 11-2-1/11-2-2, 12-2-1/12-2-2 (of course, the final prediction layers of the parallel decoders may be different). Moreover, the first network 11 and the second network 12 perform Knowledge distillation learning, where one network serves as a teacher network and the other as a student network, allowing the transfer of knowledge acquired through the learning from one network to the other.

Here, knowledge distillation learning refers to a learning approach that employs a knowledge distillation technique, and it is a well-known learning approach that can reduce the learning time by utilizing parameter values when creating a new model through a learned base model and at the same time can make the algorithm lightweight. Therefore, this learning approach is suitable for implementing a deep learning model optimized for lightweight user terminals such as mobile or IoT devices. In this context, a network that transfers its self-learned knowledge to another network is called the teacher network, and a network that receives and learns the knowledge from another network to improve its own knowledge is called the student network.

Figure 5:
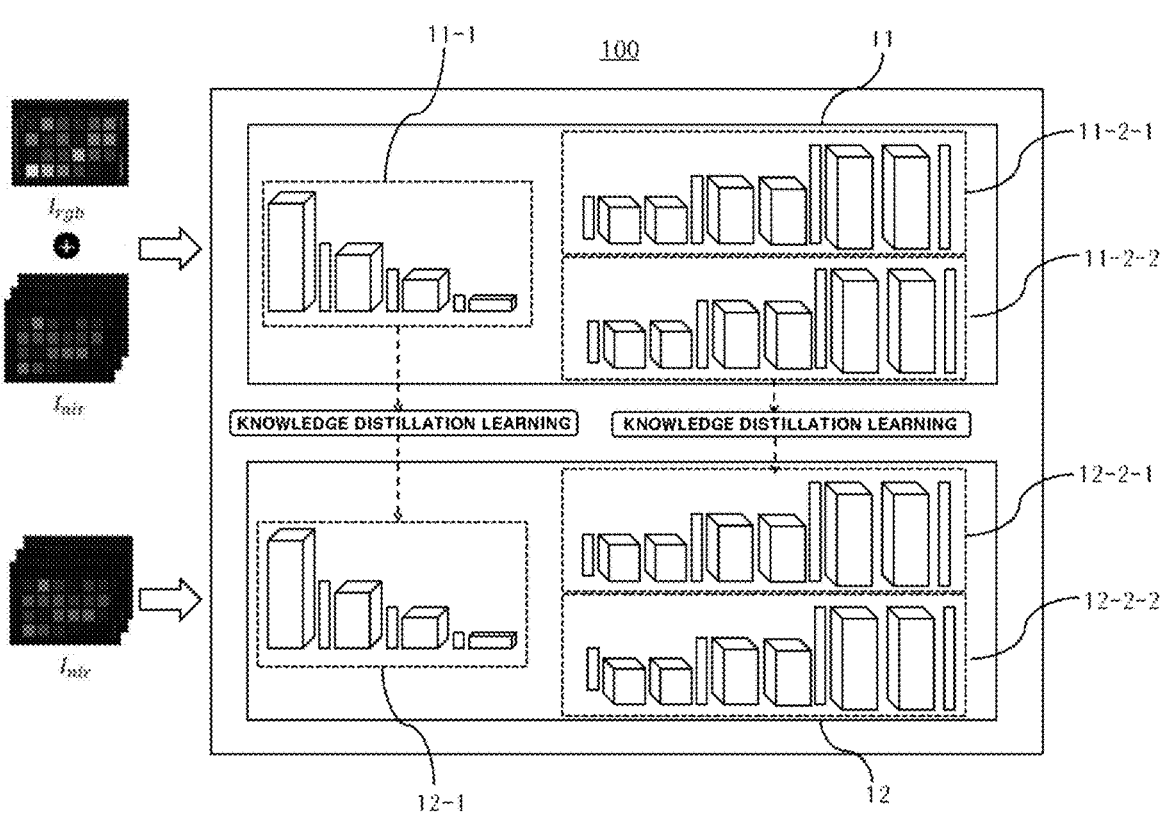
FIG. 5 is a diagram illustrating how the first network and the second network shown in FIG. 4 receive input data.

In the method for converting a near-infrared image into an RGB image according to the second embodiment of the present invention, the first network 11 is defined as the student network and the second network 12 is defined as the teacher network, and the two networks have the same internal structure. However, as illustrated in FIG. 5, the first network 11, which is the student network, receives only multi-band near-infrared image data as input data, while the second network 12, which is the teacher network, receives as input data not only multi-band near-infrared image data but also RGB image data taken at the same time as the near-infrared image data, and both networks can output RGB images.

Figure 6:
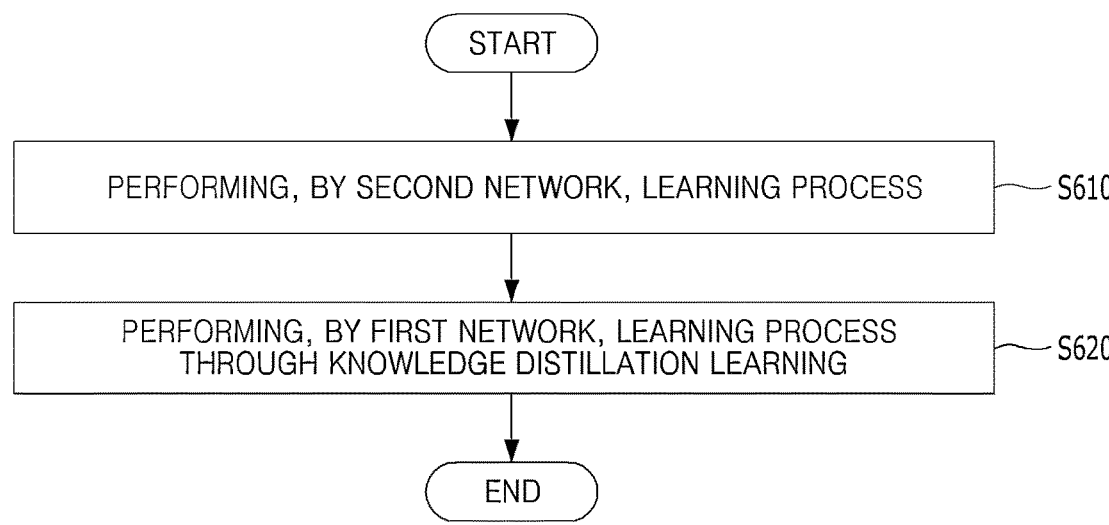
FIG. 6 is a flowchart illustrating the learning process of the first network and the second network used in the method for converting a near-infrared image into an RGB image according to the second embodiment of the present invention.
Figure 7:
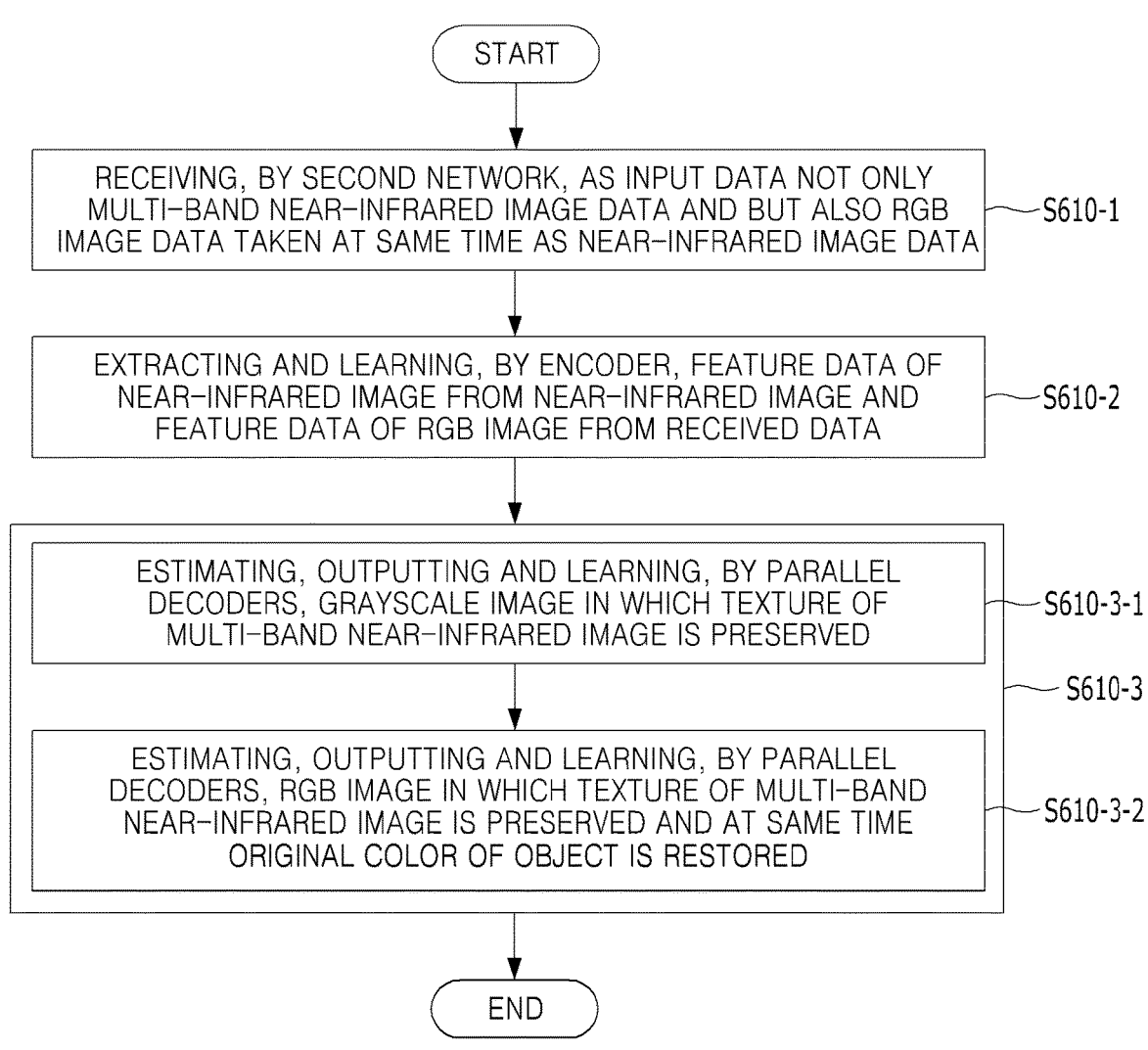
FIG. 7 is a flowchart illustrating the learning process of the second network in the method for converting a near-infrared image into an RGB image according to the second embodiment of the present invention.

FIG. 6 is a flowchart illustrating the learning process of the first network 11 and the second network 12 used in the method for converting a near-infrared image into an RGB image according to the second embodiment of the present invention, FIG. 7 is a flowchart illustrating the learning process of the second network 12, and FIG. 8 is a flowchart illustrating the learning process of the first network 11.

However, this is merely a preferred embodiment to achieve the object of the present invention, and it is understood that some steps may be added or deleted as needed and one step may be included and performed within another step.

Referring to FIG. 6, first, the second network 12, which is the teacher network, performs the learning process (S610). In detail, referring to FIG. 7, the second network 12 receives as input data not only multi-band near-infrared image data and but also RGB image data taken at the same time as the near-infrared image data (S610-1), and the encoder 12-1 extracts and learns feature data of the near-infrared image from a near-infrared image and feature data of an RGB image (i.e., correlation between the multi-band near-infrared image and the RGB spectrum) from the received data (S610-2). Subsequently, each of the two parallel decoders 12-2-1/12-2-2 estimates, outputs and learns a grayscale image in which the texture of the multi-band near-infrared image is preserved as well as an RGB image in which the texture of the multi-band near-infrared image is preserved and at the same time the original color of an object is restored (S610-3, S610-3-1/S610-3-2).

Next, the first network 11, which is the student network, performs the learning process through knowledge distillation learning (S620). In detail, referring to FIG. 8, the first network 11 performs the learning process with the same data set as the second network 12, which is the teacher network, but receives only the multi-band near-infrared image data as input data without receiving the RGB image data (S620-1). Subsequently, the first network 11 receives and learns the knowledge, which enables to mimic the behavior of extracting the feature data of the near-infrared image and the feature data of the RGB image from the second network 12, which has already performed the learning process, to extract the features of the near-infrared image data (S620-2). Then, the first network 11 receives and learns the knowledge, which enables to mimic the behavior of estimating the images for the output of grayscale images and RGB images from the near-infrared image data as learning data and the RGB image data, using the corresponding knowledge from the second network 12, to estimate and output a grayscale image in which the texture of the multi-band near-infrared image is preserved and an RGB image in which the texture of the multi-band near-infrared image is preserved and at the same time the original color of an object is perfectly restored (S620-3, S620-3-1/S620-3-2).

In this way, since the first network 11, which is the student network, receives and learns the knowledge learned by the second network 12, which is the teacher network, the learning time can be drastically reduced, and the learning algorithm can also be lightweight. This is because the second network 12 receives input data that includes not only the near-infrared image data but also the RGB image data. As a result, the second network 12 receives more diverse and comprehensive knowledge, compared to the case where the input data includes only the near-infrared image data. By transferring the corresponding knowledge to the first network 11, the first network 11 gains knowledge for enhancing the details and color quality of the RGB image according to the second network 12 without the need for inputting the RGB image data.

Meanwhile, the learning of the knowledge transferred from the second network 12 to the first network 11, more specifically the knowledge distillation learning, can be performed by applying a second loss function (Lkd), which can be defined as follows:

$$\text{Second loss function } (Lkd) = \sum_{[i \in layers]} \left\| F_i^S - \alpha\left(F_i^T\right) \right\|_2.$$

Here, the second loss function is the L2 norm between a feature map of the second network 12, FT, and a feature map of the first network 11, FS, where $\alpha$ is an illustrative additional operation performed to make the feature map of the second network 12 more useful for the learning of the first network 11.

Furthermore, during the learning process of the first network 11, which is the student network, the learning of the second network 12, which is the teacher network, is not separately performed, and the second network 12 maintains its state after transferring the knowledge to the first network 11. The learning of the knowledge received from the second network 12 may be performed before step S620-1 or performed along with the step of extracting the features of the near-infrared image data in step S620-2 or along with the step of estimating and outputting the grayscale image and the RGB image in step S620-3-1 and S620-3-2. Therefore, it is more meaningful to focus on effectively learning the knowledge received from the second network 12, rather than at which step the learning is performed.

Referring back to the description of FIG. 2, if the apparatus 100 receives the near-infrared image data and inputs the received data to the first network 11, the apparatus 100 causes the first network 11 to extract the feature data of the near-infrared image from the input near-infrared image data (S220).

Here, in extracting the feature data of the near-infrared image, the first network 11 can utilize the knowledge received from the second network 12 as described above, more specifically, the knowledge, which enables to mimic the behavior of extracting the feature data of the near-infrared image and the feature data of the RGB image from the second network 12, and a detailed description will be omitted to avoid redundancy.

Meanwhile, after step S220 and before proceeding to step S230, the apparatus 100 may cause the first network 11 to output an estimated grayscale image, which enables to convert the input near-infrared image data into a grayscale image, using the extracted feature data of the near-infrared image (S225).

Since the first network 11 estimates and outputs the grayscale image, this step is the same as step S620-3-1 of estimating and outputting the grayscale image in which the texture of the multi-band near-infrared image is preserved, which has been previously described with reference to FIG. 8 regarding the learning of the first network 11, and thus a detailed description will be omitted to avoid redundancy. The first network 11, which is configured to estimate and output an image obtained by converting a near-infrared image into an RGB image, estimates and outputs a grayscale image together with the RGB image, contributing to improving the performance of RGB image estimation.

In addition, the apparatus 100 may output a final grayscale image by applying a third loss function (Lgray) to the estimated grayscale image output in step S225 (S227).

Here, the third loss function may be the sum of two loss functions as follows:

$$\text{Third loss function } (Lgray){=}L\text{struct}{+}L\text{SSIM}.$$

Here, Lstruct is the L1 norm between the final grayscale image and a ground-truth grayscale image. By using Lstruct as the L1 norm, a grayscale image with less blurring than the L2 norm can be obtained, which can be expressed as follows:

$$L\text{struct}{=}\|\tilde{I}_{gray}{-}I_{gray}\|_1.$$

LSSIM is a loss function for enhancing the structural similarity between the final grayscale image and the ground-truth grayscale image and can be expressed as follows:

$$L\text{SSIM}{=}1{-}\text{SSIM}(\tilde{I}\text{gray},I\text{gray}).$$

The third loss function, which is the sum of the above two loss functions, can be considered as a loss function used to estimate and output a grayscale image.

Once the feature data of the near-infrared image has been extracted, the apparatus 100 may cause the first network 11 to output an estimated RGB image, which enables to convert the input near-infrared image data into an RGB image, using the extracted feature data of the near-infrared image (S230).

Here, in estimating and outputting the RGB image, the first network 11 can utilize the knowledge received from the second network 12 as described above, more specifically, the knowledge, which enables to mimic the behavior of estimating the images for the output of grayscale images and RGB images from the near-infrared image data as learning data and the RGB image data, using the corresponding knowledge (i.e., knowledge received to mimic the behavior of extracting the features) from the second network 12, and a detailed description will be omitted to avoid redundancy.

In addition, the apparatus 100 may output a final RGB image by applying a first loss function (Lgray) to the estimated RGB image output in step S230 (S235).

Here, the first loss function may be the sum of two loss functions as follows:

$$\text{First loss function } (Lrgb){=}L\text{content}{+}L\text{perceptual}{+}L\text{angular}.$$

Here, Lcontent is the L1 norm between the final RGB image and the ground-truth RGB image. By using Lstruct as the L1 norm, an RGB image with less blurring than the L2 norm can be obtained, which can be expressed as follows:

$$L\text{content}{=}\|\tilde{I}_{rgb}{-}I_{rgb}\|_1.$$

Lperceptual is a criterion for evaluation of consistency of detail and texture of the final RGB image and can be expressed as follows:

$$L\text{perceptual}{=}\Sigma_{layer}|VGG(\tilde{I}_{rgb}){-}VGG(I_{rgb})|_{layer}.$$

Langular is an angular error for improving the color restoration quality of the final RGB image and can be expressed as follows:

$$L\text{angular} = \arccos\left(\frac{\tilde{I}rgb \cdot Irgb}{\|\tilde{I}_{rgb}\| \, \|I_{rgb}\|}\right).$$

The above-described first loss function, which is the sum of the above three loss functions, can be considered as a loss function used to estimate and output an RGB image.

Figure 9:
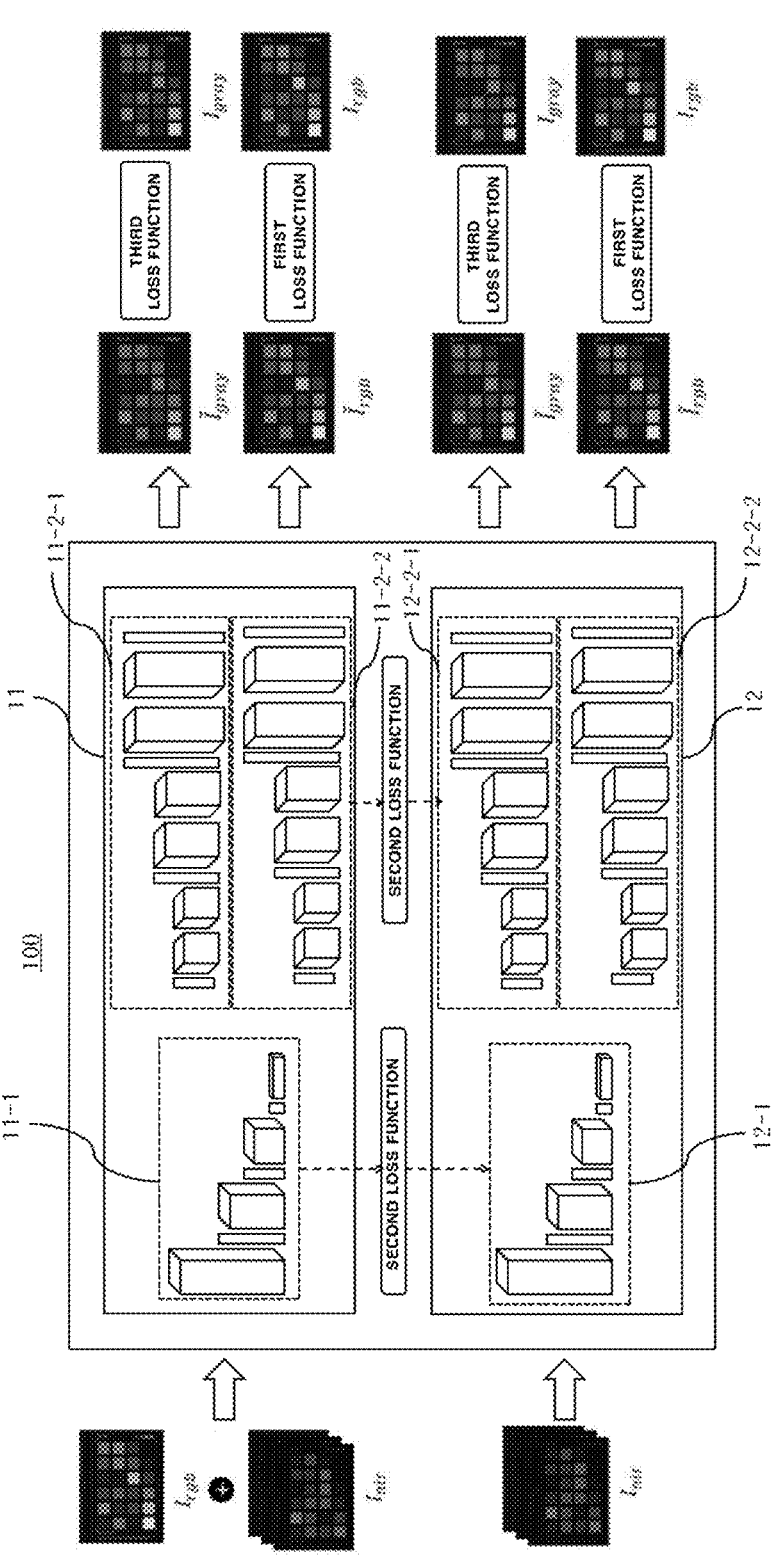
FIG. 9 is a diagram illustrating the process of inputting near-infrared image data and RGB image data to the apparatus to output intermediate products including estimated grayscale images and estimated RGB images and final products including final grayscale images and final RGB images, as well as loss functions applied in the respective operation processes.

FIG. 9 is a diagram illustrating the process of inputting near-infrared image data (Inir) and RGB image data (Irgb) to the apparatus 100 to output intermediate products including estimated grayscale images ($\tilde{I}_{gray}$) and estimated RGB images ($\tilde{I}_{rgb}$) and final products including final grayscale images (Igray) and final RGB images (Irgb), as well as loss functions applied in the respective operation processes. The total loss function (Ltotal), which is applied to the entire apparatus 100 according to FIG. 9 and the above description, can be expressed as the sum of the first loss function, the second loss function, and the third loss function as follows:

$$\text{Total loss function } (Ltotal){=}Lkd{+}Lgray{+}Lrgb.$$

The method for converting a near-infrared image into an RGB image according to the second embodiment of the present invention has been described so far. According to the present invention, by employing the knowledge distillation learning, the second network 12, which is the teacher network, receives as input data not only near-infrared image data but also RGB image data taken at the same time as the near-infrared image data, and based on this, transfers the knowledge, which enables to mimic the behavior of extracting the feature data of the near-infrared image and the feature data of the RGB image, as well as the knowledge, which enables to mimic the behavior of estimating the images for the output of grayscale images and RGB images from the near-infrared image data and the RGB image data, to the first network 11, which is the student network, facilitating a rapid and efficient learning. As a result, even if only a near-infrared image which does not contain color information is input, it is possible to effectively convert the input image into an RGB image which contains color information.

Furthermore, the quality of image conversion is improved by applying a loss function for the knowledge distillation learning, a loss function for estimating the final grayscale image, and a loss function for estimating the final RGB image, and thus it is possible to obtain a high-quality RGB image in which the texture and detail of the multi-band near-infrared image is preserved and the original color of an object is perfectly restored.

In addition, by utilizing the multi-band near-infrared images acquired with three different optical band-pass filters instead of single-band near-infrared images, it is possible to obtain more detailed information, making it useful for finding the correlation between each near-infrared band and RGB spectrum, thereby improving the learning efficiency of the network.

Figure 10:
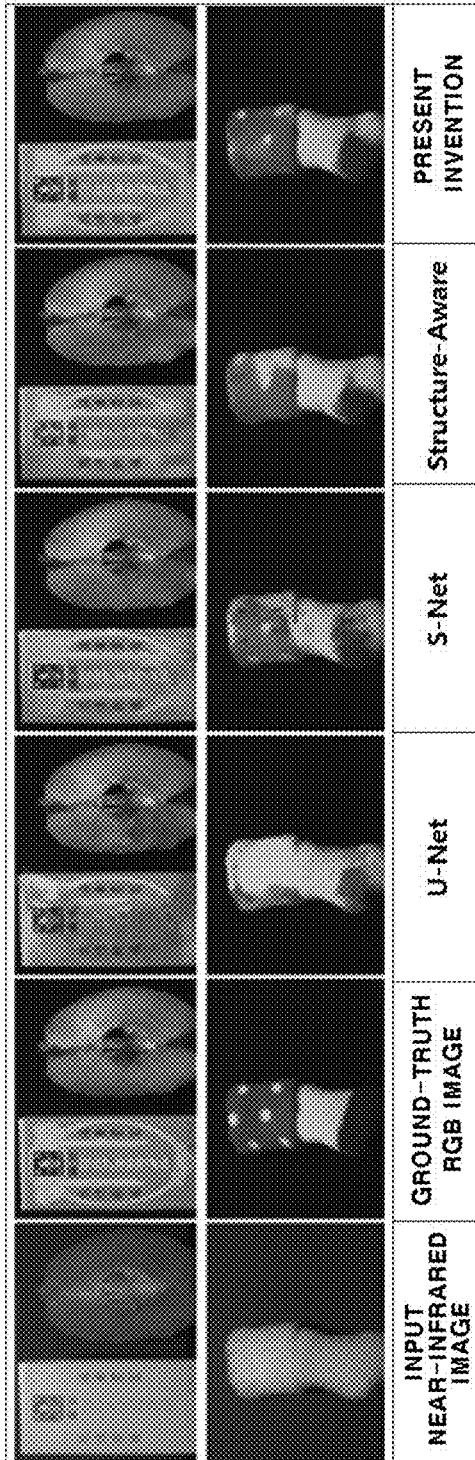
FIG. 10 is a diagram illustrating comparison result 1 with the prior art regarding the performance of the method for converting a near-infrared image into an RGB image according to the second embodiment of the present invention.

FIG. 10 is a diagram illustrating the comparison results with the prior art regarding the performance of the method for converting a near-infrared image into an RGB image according to the second embodiment of the present invention, and showing, from left to right, the near-infrared image and the ground-truth RGB image as input data, the estimated images produced by the prior art methods including U-Net, S-Net, and Structure-Aware, and the estimated RGB image produced by the method for converting a near-infrared image into an RGB image according to the second embodiment of the present invention. It can be seen that compared to the ground-truth RGB image, the results of the prior art U-Net show a lot of loss of text readability and texture information, and the results of S-Net and Structure-Aware show visual artifacts such as unnatural color distortions and a loss of texture information in local areas. In contrast, it can be observed that the method for converting a near-infrared image into an RGB image according to the second embodiment of the present invention produces an RGB image with improved quality of color restoration while preserving the readability and texture information, indicating that the method of the present invention provides high quality of image conversion.

Figure 11:
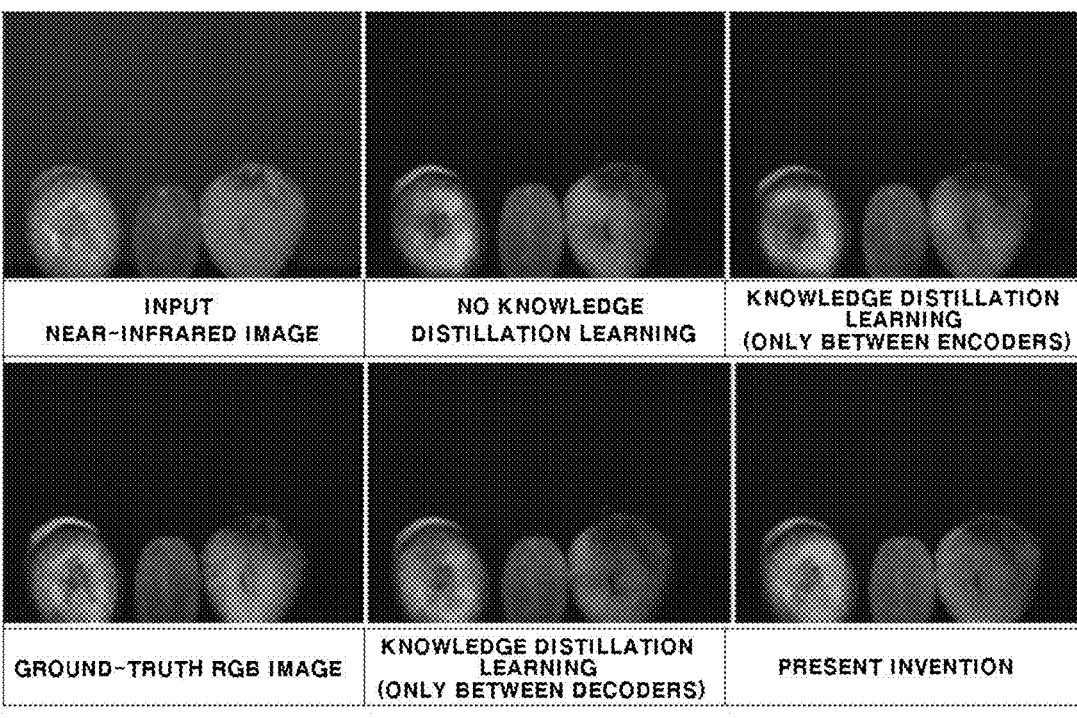
FIG. 11 is a diagram illustrating comparison result 2 with the prior art regarding the performance of the method for converting a near-infrared image into an RGB image according to the second embodiment of the present invention.

FIG. 11 is a diagram illustrating the comparison results with the prior art regarding the performance of the method for converting a near-infrared image into an RGB image according to the second embodiment of the present invention, and showing the near-infrared image and the ground-truth RGB image as input data at the top left and bottom, the estimated image obtained without knowledge distillation learning at the top center, the estimated image obtained by applying the knowledge distillation learning only between encoders (mimicking the behavior of extracting the features) at the top right, the estimated image obtained by applying the knowledge distillation learning only between decoders (mimicking the behavior of estimating the images) at the bottom center, and the estimated RGB image at the bottom right according to the present invention. It can be seen that in the case where the knowledge distillation learning is not performed, the texture is not properly preserved and the quality of color restoration is also poor, compared to the case where the knowledge distillation learning is applied only between the encoders or between the decoders. This serves as evidence that the knowledge distillation learning contributes to the improvement of the quality of conversion from near-infrared images into RGB images, and it can be concluded that the method for converting a near-infrared image into an RGB image according to the second embodiment of the present invention, in which the knowledge distillation learning is applied between both encoders and decoders, provides the highest quality of image conversion, compared to the ground-truth RGB image.

Meanwhile, the apparatus 100 for converting a near-infrared image into an RGB image according to the first embodiment of the present invention and the method for converting a near-infrared image into an RGB image according to the second embodiment of the present invention can also be implemented as a computer program stored on a computer-readable medium according to a third embodiment of the present invention. In this case, the computer program stored on a computer-readable medium, when executed on a computing device, may perform the steps of: (AA) receiving near-infrared image data to be converted into a RGB image and inputting the received data to a first network; (BB) extracting, by the first network, feature data of a near-infrared image from the input near-infrared image data; and (CC) outputting, by the first network, an estimated RGB image, which enables to convert the received near-infrared image data into an RGB image, using the extracted feature data of the near-infrared image. Although not described in detail for the sake of avoiding redundancy, all the technical features applied to the apparatus 100 for converting a near-infrared image into an RGB image according to the first embodiment of the present invention and the method for converting a near-infrared image into an RGB image according to the second embodiment of the present invention can be equally applied to the computer program stored on a computer-readable medium according to the third embodiment of the present invention.

Although the embodiments of the present invention have been described with reference to the accompanying drawings, those skilled in the art to which the present invention pertains can understand that the present disclosure can be implemented in other specific forms without changing the technical spirit or essential features thereof. Therefore, the embodiments described above should be understood as illustrative in all respects and not restrictive.

BRIEF DESCRIPTION OF REFERENCE NUMERALS

10: processor
11: first network
12: second network
11-1, 12-1: encoder
11-2-1, 11-2-2, 12-2-1, 12-2-2: decoder
20: network interface
30: memory
40: storage
41: computer program
50: data bus
100: apparatus 100 for converting a near-infrared image into an RGB image

What is claimed is:

1. A method for converting a near-infrared image into an RGB image, performed by an apparatus comprising a first network and a second network, the method comprising the steps of:
   (a) receiving near-infrared image data to be converted into an RGB image and inputting the received data to the first network;
   (b) extracting, by the first network, feature data of a near-infrared image from the input near-infrared image data; and
   (c) outputting, by the first network, an estimated RGB image, wherein the first network is configured to convert the received near-infrared image data into an RGB image, using the extracted feature data of the near-infrared image,
   wherein the first network performs knowledge distillation learning by receiving knowledge, wherein the first network is configured to mimic the behavior of extracting the feature data of the near-infrared image and the feature data of the RGB image, from the second network which has received as input data not only near-infrared image data as learning data but also RGB image data taken at the same time as the near-infrared image.

2. The method for converting a near-infrared image into an RGB image of claim 1, wherein the near-infrared image data in step (a) and the near-infrared image data as learning data are multi-band near-infrared image data and image data acquired with a plurality of different optical filters.

3. The method for converting a near-infrared image into an RGB image of claim 2, wherein the plurality of different optical filters comprise three optical band-pass filters with the peak wavelengths of 785 nm, 850 nm, and 940 nm.

4. The method for converting a near-infrared image into an RGB image of claim 1, wherein the first network and the second network have the same structure including one encoder and two parallel decoders.

5. The method for converting a near-infrared image into an RGB image of claim 1, wherein the first network performs knowledge distillation learning by receiving knowledge, wherein the first network is configured to mimic the behavior of estimating the images for the output of grayscale images and RGB images from the near-infrared image data and the RGB image data as learning data from the second network which has extracted the feature data of the near-infrared image and the feature data of the RGB image.

6. The method for converting a near-infrared image into an RGB image of claim 1, further comprising, after step (c), the step of:

(d) outputting a final RGB image by applying a first loss function ($L_{rgb}$) to the estimated RGB image output in step (c), wherein the first loss function is the sum of three loss functions as follows:

First loss function $(L_{rgb})=L_{content}+L_{perceptual}+L_{angular}$, where $L_{content}$ is the L1 norm between the final RGB image and a ground-truth RGB image, $L_{perceptual}$ is a criterion for evaluation of consistency of detail and texture of the final RGB image, and $L_{angular}$ is an angular error for improving the color restoration quality of the final RGB image.

7. The method for converting a near-infrared image into an RGB image of claim 1, wherein the knowledge distillation learning is performed by applying a second loss function ($L_{kd}$), which is defined as follows:

$$\text{Second loss function } (L_{kd}) = \sum_{[i\in layers]}\left\|F_i^S - \alpha\!\left(F_i^T\right)\right\|_2,$$

where the second loss function is the L2 norm between a feature map of the second network, $F^T$, and a feature map of the first network, $F^S$, where $\alpha$ is an illustrative additional operation performed to make the feature map of the second network more useful for the learning of the first network.

8. The method for converting a near-infrared image into an RGB image of claim 1, further comprising, between steps (b) and (c), the step of:

(b') outputting, by the first network, an estimated grayscale image, wherein the first network is configured to convert the input near-infrared image data into a grayscale image, using the extracted feature data of the near-infrared image.

9. The method for converting a near-infrared image into an RGB image of claim 8, further comprising, between steps (b') and (c), the step of:

(b") outputting a final grayscale image by applying a third loss function ($L_{gray}$) to the estimated grayscale image output in step (b'), wherein the third loss function is the sum of two loss functions as follows:

16

Third loss function $(L_{gray})=L_{struct}+L_{SSIM}$, where $L_{struct}$ is the L1 norm between the final grayscale image and a ground-truth grayscale image and $L_{SSIM}$ is a loss function for enhancing the structural similarity between the final grayscale image and the ground-truth grayscale image.

10. An apparatus for converting a near-infrared image into an RGB image, comprising:

one or more processors;

a network interface;

a memory for loading a computer program executed by the processor; and a storage for storing large-scale network data and the computer program, wherein the computer program, when executed, causes the one or more processors to perform the operations of:

(A) receiving near-infrared image data to be converted into an RGB image and inputting the received data to a first network;

(B) extracting, by the first network, feature data of a near-infrared image from the input near-infrared image data; and (C) outputting, by the first network, an estimated RGB image, wherein the first network is configured to convert the received near-infrared image data into an RGB image, using the extracted feature data of the near-infrared image, and wherein the first network performs knowledge distillation learning by receiving knowledge, which enables to mimic the behavior of extracting the feature data of the near-infrared image and the feature data of the RGB image, from the second network which has received as input data not only near-infrared image data as learning data but also RGB image data taken at the same time as the near-infrared image.

11. A computer program stored on a non-transitory computer-readable medium, when executed on a computing device, performing the steps of:

(AA) receiving near-infrared image data to be converted into a RGB image and inputting the received data to a first network;

(BB) extracting, by the first network, feature data of a near-infrared image from the input near-infrared image data; and (CC) outputting, by the first network, an estimated RGB image, wherein the first network is configured to convert the received near-infrared image data into an RGB image, using the extracted feature data of the near-infrared image, and wherein the first network performs knowledge distillation learning by receiving knowledge, which enables to mimic the behavior of extracting the feature data of the near-infrared image and the feature data of the RGB image, from the second network which has received as input data not only near-infrared image data as learning data but also RGB image data taken at the same time as the near-infrared image.

* * * * *